US 8,743,954 B1

(12) United States Patent
Masterson

(10) Patent No.: US 8,743,954 B1
(45) Date of Patent: Jun. 3, 2014

(54) ARCHITECTURE FOR ADJUSTING BIT RATE BASED ON MEASURED QUALITY

(75) Inventor: Anthony D. Masterson, Saratoga, CA (US)

(73) Assignee: Zenverge, Inc., Santa Clara, CA (US)

( * ) Notice: Subject to any disclaimer, the term of this patent is extended or adjusted under 35 U.S.C. 154(b) by 1268 days.

(21) Appl. No.: 12/362,453

(22) Filed: Jan. 29, 2009

Related U.S. Application Data

(60) Provisional application No. 61/025,530, filed on Feb. 1, 2008.

(51) Int. Cl.
*H04N 11/02* (2006.01)
(52) U.S. Cl.
USPC .................................................. 375/240.05
(58) Field of Classification Search
USPC .................................................. 375/240.05
See application file for complete search history.

(56) References Cited

U.S. PATENT DOCUMENTS

| | | | | |
|---|---|---|---|---|
| 6,590,936 | B1 * | 7/2003 | Kadono | 375/240.12 |
| 6,654,417 | B1 * | 11/2003 | Hui | 375/240.03 |
| 2005/0063461 | A1 * | 3/2005 | Lee et al. | 375/240.03 |
| 2005/0249293 | A1 * | 11/2005 | Zeng et al. | 375/240.29 |
| 2006/0153541 | A1 * | 7/2006 | Dumont | 386/112 |
| 2006/0158524 | A1 * | 7/2006 | Yang et al. | 348/208.6 |
| 2007/0031049 | A1 * | 2/2007 | Kim | 382/239 |
| 2007/0031050 | A1 * | 2/2007 | Shin | 382/239 |
| 2007/0071097 | A1 * | 3/2007 | Koto | 375/240.12 |
| 2007/0140352 | A1 * | 6/2007 | Bhaskaran et al. | 375/240.24 |
| 2008/0240250 | A1 * | 10/2008 | Lin et al. | 375/240.18 |
| 2008/0260042 | A1 * | 10/2008 | Shah et al. | 375/240.25 |

\* cited by examiner

*Primary Examiner* — Michael Pyzocha
(74) *Attorney, Agent, or Firm* — Fenwick & West LLP

(57) ABSTRACT

A system and method includes adjusting bit rate based on measured quality in a video conversion module. The video conversion module may be, for example, an encoder or a transcoder. In one embodiment, the video conversion module receives an input stream in a first format and converts the input stream to an output stream in a second format. The video conversion module is coupled to a bit rate controller that controls the bit rate of the output stream. A bit rate controller compares the output quality of the output stream to a target quality, and adjusts the output bit rate responsive to the comparison having a difference greater than a predetermined value.

24 Claims, 8 Drawing Sheets

ARCHITECTURE FOR ADJUSTING BIT RATE BASED ON MEASURED QUALITY

CROSS-REFERENCE TO RELATED APPLICATION

This application claims priority under 35 U.S.C. §119(e) to U.S. Provisional Patent Application No. 61/025,530 entitled "Architecture for Adjusting Bit Rate Based on Measured Quality," filed on Feb. 1, 2008, which is incorporated by reference herein in its entirety.

FIELD OF THE ART

The subject matter disclosed generally relates to media processing, and more specifically, to improving video quality in a media processing device.

BACKGROUND

Conventionally, multimedia such as video and audio has been delivered using analog delivery mediums such as NTSC (National Television System Committee) signals, and has been stored using analog storage mediums such as video cassette recorders. With the advent of digital delivery mediums, such as ATSC (Advanced Television Systems Committee) signals, and of digital storage mediums and DVDs, multimedia can be delivered and stored using pure digital signals. Digital signals typically contain compressed frames of video.

Traditionally, video is compressed using an encoder adapted to receive an uncompressed input stream and generate an output stream in a compressed format. The output stream may, for example, be stored to a digital storage medium or transmitted over a network in the compressed format. For playback, a decoder at a remote receiver receives the compressed media stream (e.g., from the storage medium or from the network) and generates an uncompressed output stream that that can be directly coupled to the playback device.

Compressed video may also be obtained from a transcoder. A transcoder converts a digital media stream from a first compressed format to a second compressed format. Typically, a transcoder comprises a decoder, a processing unit, and an encoder. The decoder receives a compressed media stream in a first compressed format and decodes the media stream to an intermediate format. The media stream is processed by the processing unit in the intermediate format and outputted to the encoder. The encoder encodes the media stream to a second compressed format that may be different than the first compressed format.

Generally, compressing media reduces the amount of data used to represent the media and reduces the bit rate, defined as the number of bits processed or transmitted per unit of time. Reducing bit rate advantageously reduces system requirements for processing power, network bandwidth, and storage capacity. However, reducing the bit rate comes at a cost of increased distortion and a drop in video quality. Video quality can be described as a measure of perceived degradation in the video as a result of compressing the video. For example, a video quality measure may describe the relative degradation between an original uncompressed video stream and a final decoded video stream at a remote receiver.

FIG. 1A illustrates the general relationship between bit rate, distortion, and quality. As bit rate increases, distortion typically decreases and quality increases because more information is available to describe the video frames. According to various protocols, a higher bit rate may result in increased frame rate or resolution, or decreased quantization. A bit rate that falls too low can result in very high distortion and unacceptably poor video quality. The extent to which a change in bit rate affects video quality is also determined by the content, and particularly the level of detail, in the video frames. Detail refers to the quantity of information needed to describe a segment of video at a particular level of quality. For example, a video sequence having slow motion and large uniform areas has relatively low detail compared to a video sequence having high motion and high spatial variation.

In FIG. 1B, the level of detail determines which curve represents the relationship between bit rate, distortion, and quality. If detail increases, there is a resulting increase in bit rate and/or increase in distortion (and associated drop in quality). Due to limitations in buffer sizes, network bandwidth, and other constraints, conventional devices are generally forced to impose a near constant bit rate. In order to do so, conventional devices must increase distortion (e.g., by increasing quantization) for frames with increased detail. This further means that the conventional system cannot directly control the quality level and instead allows quality to fluctuate over time.

FIG. 2 illustrates a conventional encoder configuration that embodies the principles described above. The conventional encoder configuration attempts to maintain a constant bit rate by adjusting quantization based on the bit rate. An encoder 200 is coupled to an uncompressed input source 202. The encoder 200 encodes the uncompressed input source 202 to generate a compressed output stream 204. The encoder is coupled to a rate controller 210 to control the quantization level 208 in the encoder 200. The rate controller 210 is supplied the bit rate 206 from the encoder estimating the level of detail in the input stream 202. Based on the bit rate 206 and a target bit rate 212 set external to the encoder configuration, the quantization controller 210 determines the quantization level 208 to be used by the encoder 200.

The conventional system controls the output bit rate but has no direct control over output quality. As a result of controlling the bit rate and varying frame detail, the level of distortion and quality varies in the compressed output stream. Thus, the conventional encoder 200 may generate video with low quality for sequences of highly detailed frames. Further, when the frame detail is very low, the bit rate may be set unnecessarily high, wasting processing, networking, and storage resources. In view of the problems presented above, the present state of the art lacks a video conversion device that can receive a target quality level and adjust the output bit rate over time to match the target quality.

SUMMARY

Disclosed herein is a system a method for adjusting the output bit rate of a video conversion module based on measured quality. The video conversion module may be, for example, an encoder or a transcoder. In one embodiment, the video conversion module is adapted to receive an input stream in a first format and convert the input stream to an output stream in a second format. The video conversion module is coupled to a bit rate controller that controls the bit rate of the output stream. The bit rate controller compares a quality score of the output stream to a target quality, and adjusts the output bit rate responsive to the comparison having a difference greater than a predetermined value.

In one embodiment, the system generates a quality score representing an estimate of the output quality. For example, the video conversion module may generate an input comparison block from the received input stream and an output comparison block from a decoding of the output stream. A quality checker receives the input comparison block and the output comparison block and generates a quality score based on the input and output comparison blocks. According to one embodiment, the quality score comprises an estimate of the output quality. The quality score is output to the bit rate controller and compared to the target quality in order to determine the adjustment to the output bit rate.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The teachings herein can be readily understood by considering the following detailed description in conjunction with the accompanying drawings.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles disclosed herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles disclosed herein.

System Architecture

Figure 1B:
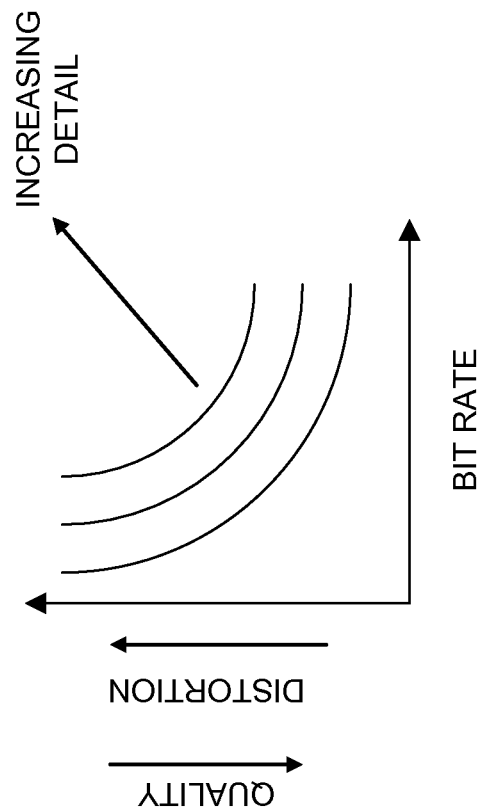
FIG. 1B is a graph illustrating the conventional relationship between bit rate, distortion, quality, and detail in a digital video stream.
Figure 1A:
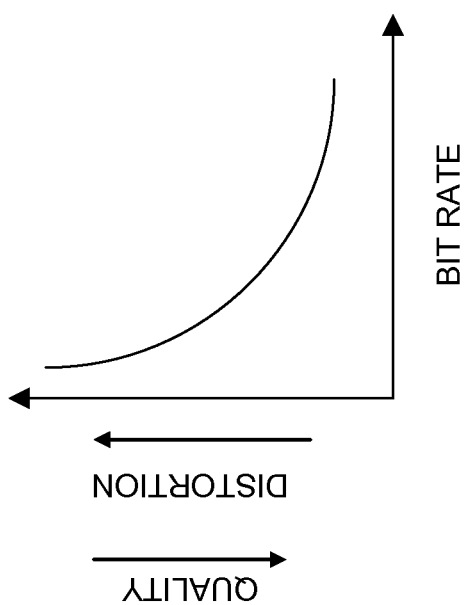
FIG. 1A is a graph illustrating the conventional relationship between bit rate, distortion, and quality in a digital video stream.
Figure 2:
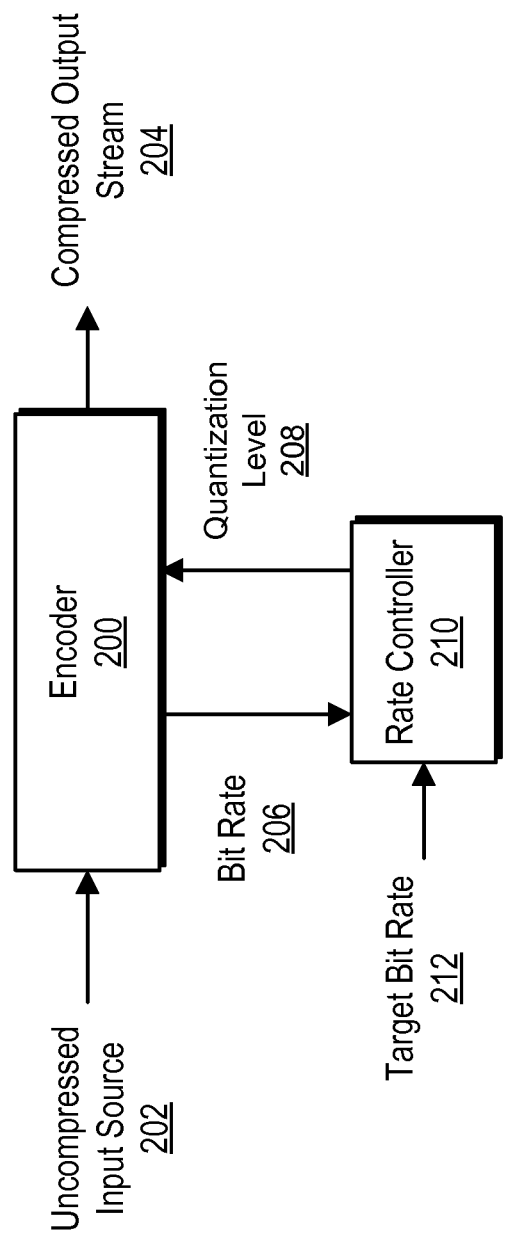
FIG. 2 is a block diagram illustrating a conventional encoder configuration.
Figure 3:
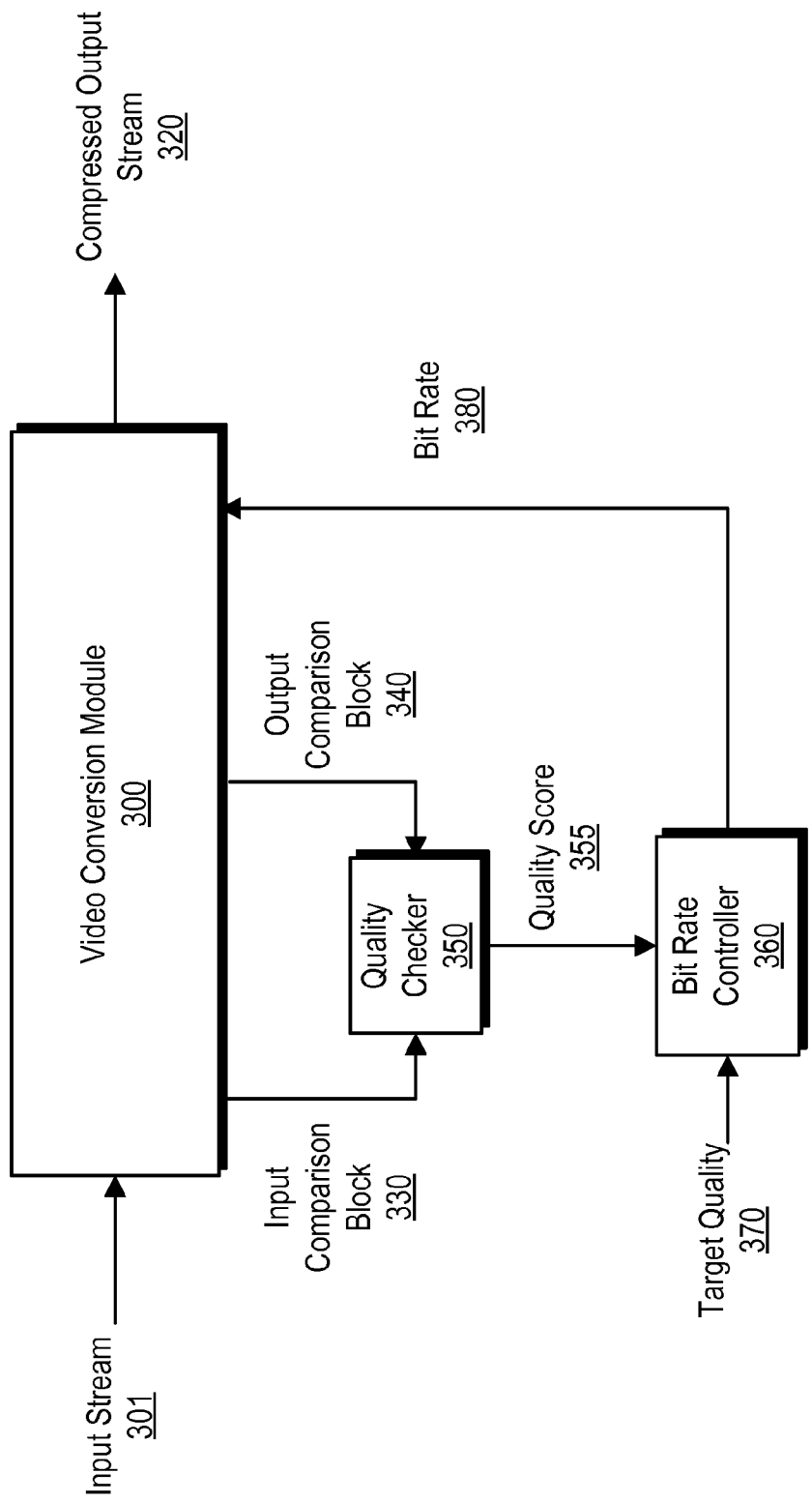
FIG. 3 is a block diagram illustrating one embodiment of a configuration for adjusting bit rate in a video conversion module based on measured quality.

FIG. 3 is a block diagram illustrating an architecture for adjusting bit rate based on measured quality, according to one embodiment. For the purposes of illustration, the architecture is described in terms of a system. According to various embodiments, the architecture can be implemented as hardware, software, an integrated circuit, and so on. Other methods for electronically implementing computational steps will be apparent to one of skill in the art without departing from the scope of the disclosure herein.

The architecture includes a video conversion module 300, a quality checker 350 and a bit rate controller 360. The video conversion module 300 couples an input through which an input stream 301 is received and an output through which a compressed output stream 320 is transmitted. The video conversion module 300 also couples the quality checker 350 and the bit rate controller 360. The quality checker 350 is coupled to receive an input comparison block 330 and an output comparison block 340 from the video compression module 300. The bit rate controller 360 couples an input through which a target quality value 370 is received. In one embodiment, the target quality value 370 is temporarily stored in a temporary storage such as a buffer or cache. The bit rate controller 360 couples the quality checker 350 to input a quality score 355. The bit rate controller 360 also couples the video compression module 300 to output a bit rate 380 to it.

Referring back to the video conversion module 300, it is adapted receive an input stream 301 and generate a compressed output stream 320. In one embodiment, the video conversion module 300 is an encoder. In this embodiment, the input stream 301 can comprise a sequence of uncompressed or raw video frames. In another embodiment, the video conversion module 300 is a transcoder. In this embodiment, the input stream 301 is received in a first compressed format and converted to the compressed output stream 320 in a second compressed format. The bit rate 380 of the compressed output stream 320 is determined at least in part by the bit rate controller 360. The compressed output streams 320 can be encoded formatted under various audio/video protocols such as, MPEG-2, MPEG-4, MP3, H.263, H.264, AVS, a RealVideo format, a Windows Media Player format such as VC-1, other video formats, other audio formats, and the like. The formats can vary in characteristics such as bit rate, resolution, quantization, and frame rate. Video encoding or transcoding by video conversion module 300 may further involve changes in picture timing, picture dimensions, image enhancement, and the like. As will be apparent to one of skill in the art, media formats discussed herein are intended to be exemplary, and other forms of compressed media and/or data may be used without departing from the scope of the disclosure.

Video conversion module 300 further generates an input comparison block 330 and an output comparison block 340. In one embodiment, the input 330 and output 340 comparison blocks comprise full frames of video outputted at regular intervals. In another embodiment, the input comparison block 330 and output comparison block 340 each comprise a single macroblock or a set of macroblocks. In alternate embodiments, input 330 and output 340 comparison blocks comprise some subset of frame, macroblocks, or sets of macroblocks outputted at regular intervals. For example, an input and output comparison block may be outputted for every fourth macroblock received by the video conversion module 300. The frequency of comparison will be balanced with the amount of storage needed for the input comparison blocks because there is a delay between receiving the input comparison block and the output comparison block. Typically, only one input comparison block is stored, so the frequency of comparison is determined by the pipeline delay of the video conversion module 300.

The input comparison block 330 represents a desired output (e.g., an output with no relative distortion) for that frame or macroblock at a remote receiver's decoder. A remote receiver could be, for example, a recipient of output stream 320. The output comparison block 340 represents an expected output at a remote receiver's decoder for the same frame or macroblock. The expected output may have some increase in distortion as a result of conversion. The input comparison block 330 and output comparison block 340 correspond to the same frame or macroblock from the input stream 301 at different stages of processing in the video conversion module 300.

Quality checker 350 compares the input comparison block 330 with the output comparison block 340 to determine a quality score 355 representing a relative quality between the input comparison block 330 and output comparison block 340. In one aspect, the quality score 355 represents a prediction of the relative qualities between the desired and the expected output at a remote receiver. Thus, the system can determine the quality of the encoded video when it is decoded by a playback device. In another aspect, the quality score 355 indicates the performance of the video conversion module 300 and reveals any degradation in video quality as a result of compressing the input stream 301 or converting the input stream between formats. The quality score 355 is output to the bit rate controller 360 and used to make on-the-fly (or real-time) adjustments to the bit rate 380.

The quality score 355 can be determined based on a number of different algorithms. In one embodiment, quality checker 350 calculates the quality score 355 by determining the peak signal-to-noise ratio (PSNR).

The PSNR is most commonly used as a measure of quality of reconstruction in image compression etc. It is most easily defined via the mean squared error (MSE) which for two m×n monochrome images I and K where one of the images is considered a noisy approximation of the other is defined as:

$$MSE = \frac{1}{mn}\sum_{i=0}^{m-1}\sum_{j=0}^{n-1} \|I(i, j) - K(i, j)\|^2$$

The PSNR is defined as:

$$PSNR = 10 \cdot \log_{10}\left(\frac{MAX_I^2}{MSE}\right) = 20 \cdot \log_{10}\left(\frac{MAX_I}{\sqrt{MSE}}\right)$$

Here, $MAX_I$ is the maximum pixel value of the image. When the pixels are represented using 8 bits per sample, this is 255.

In another embodiment, quality checker 350 calculates the quality score 355 by determining just the mean squared error (MSE). In yet another embodiment, quality checker 350 uses a subjective measure based on a psycho-visual analysis. The subjective measurement models how a human would perceive quality of the video. For example, textures might be treated differently from flat areas of the image for the purpose of quality assessment. Specific artifacts such as block and mosquito noise could be measured and scored.

The bit rate controller 360 receives the quality score 355 and compares it to a target quality level 370. Based on the comparison, the bit rate controller 360 determines the bit rate 380 for the video conversion module 300. In one embodiment, the target quality 370 can be set by a user of the system. In another embodiment, the target quality 370 can be set automatically based on various factors such as network conditions, compression format, display resolution, and so on. In one embodiment, the target quality 370 is a predetermined constant value and bit rate controller 360 adjusts bit rate 380 to maintain a quality score 355 substantially equal to the target quality 370. In another embodiment, the target quality 370 can be a range of quality values. For example, the target quality 370 may include a minimum acceptable quality, a maximum acceptable quality, and/or an average target quality. In this embodiment, the bit rate controller 360 adjusts the bit rate 380 in order to stay within the set range and/or maintain the desired average.

Generally, in order to meet the target quality 370, the bit rate controller 360 will increase the bit rate 380 if the quality score 355 is less than the target quality 370 and decrease the bit rate 380 if the quality score 355 is greater than the target quality 370. The adjusted bit rate 380 then affects the quality score 355 of future received video frames.

In alternate embodiments, the bit rate controller 360 may specify specific encoding variables that contribute to bit rate 380. For example, in one embodiment, the bit rate 380 includes individually setting quantization, frame rate, and/or resolution of the output stream 320 generated by the video conversion module 300 based on the measured quality. In one embodiment, the bit rate controller 360 uses a lookup table to determine how much to adjust quantization, frame rate, and resolution based on the measured quality. The lookup table may be designed, for example, to minimize any perceived distortion in the video signal to a viewer.

In one embodiment, the bit rate controller 360 further includes a rate control mechanism to ensure that adjustments to the output bit rate 380 do not cause overshoot in the output quality. This is typically achieved by smoothing or filtering the rate of change for the bit rate 380.

As previously mentioned, the video conversion module 300 can comprise any encoder or transcoder architecture that is adapted to output the input comparison block 330 and the output comparison block 340 for quality measurement. The following sections describe example architectures of a video conversion module 300 in the form of an encoder or a transcoder. It will be apparent to one of ordinary skill in the art that different encoder or transcoder architectures can be used without departing from the principles of the disclosure.

Encoder Architecture

Figure 4:
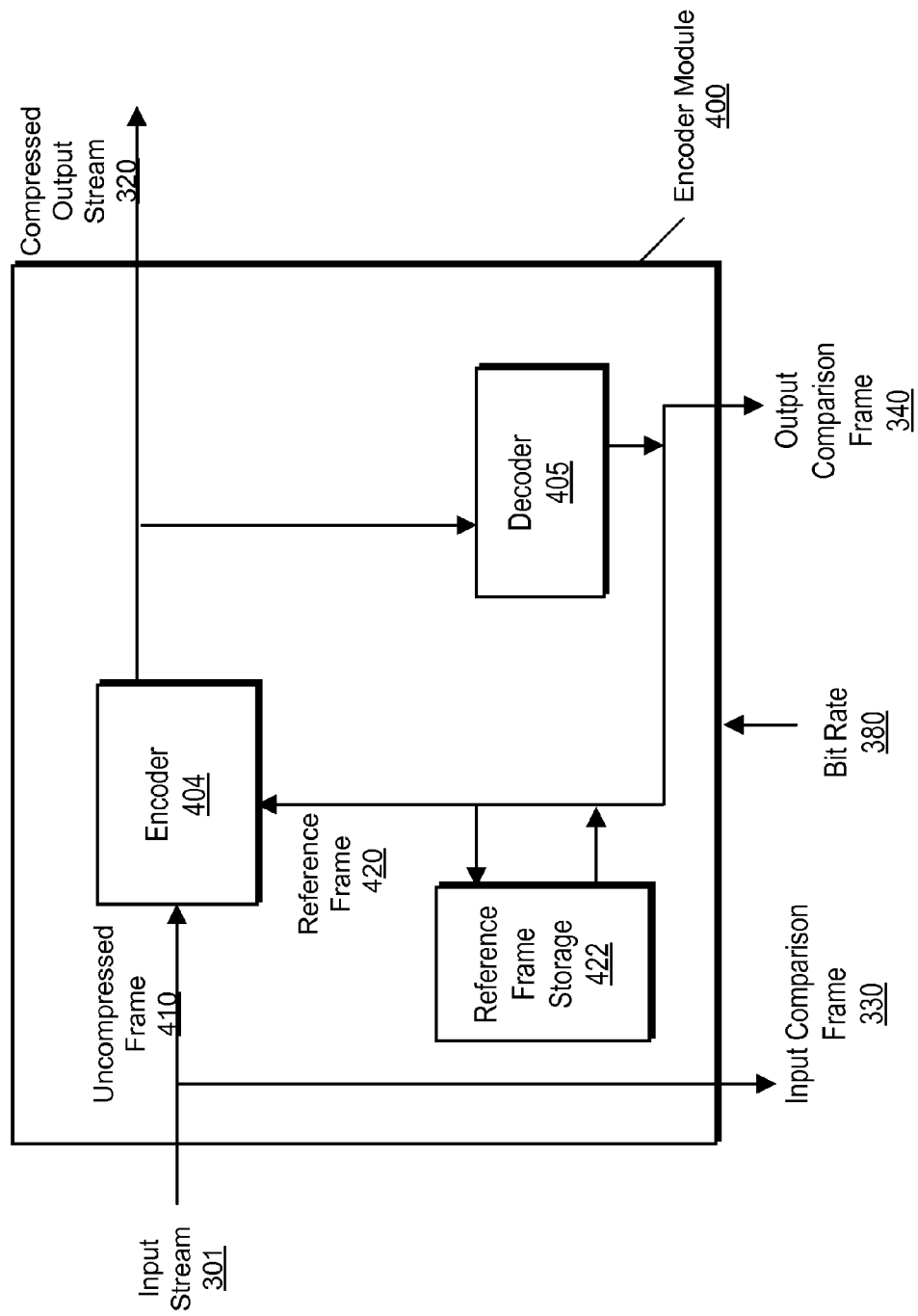
FIG. 4 is a block diagram illustrating one embodiment of an encoder module.

Referring now to FIG. 4, an example embodiment of an encoder module 400 is illustrated. In one embodiment, encoder module 400 is used as the video conversion module 300. Generally, the encoder module 400 is adapted to receive an input stream 301 and generate a compressed output stream 320. Further, encoder module 400 generates the input comparison block 330 and the output comparison block 340.

In one embodiment, the input stream 301 comprises a stream of video frames. Each video frame is divided into a set of macroblocks and each macroblock comprises a set of pixels. For example, in one embodiment, each video frame is composed of a set of macroblocks each made up of a 16×16 set of pixels. According to one embodiment, the encoder module 400 receives frames without compression. A frame without compression is considered an uncompressed frame 410. In the architecture of FIG. 4, an uncompressed frame 410 or a macroblock from an uncompressed frame 410 is used directly as the input comparison block 330.

In the encoder module 400, an encoder 404 compares an uncompressed frame 410 from the input stream 301 to a reference frame 420 from reference frame storage 422 to produce a compressed output stream 320.

The encoder module 400 includes a decoder 405 to produce new reference frames 420. The new reference frame 420 represents a re-construction of the previously encoded frame. The new reference frame 420 is stored in the reference frame storage 422 for use by the encoder 404 encoding subsequent frames.

In one embodiment, the reference frame 420 or a macroblock from the reference frame 420 is used as the output comparison block 340. The output comparison frame 340 is a processed version of the input comparison frame 330 after it has been encoded by the encoder 404 and then decoded by decoder 405. Because decoder 405 operates similarly to a decoder at a remote receiver, comparing the input comparison block 330 to the output comparison block 340 provides a good indication of the video quality of the output stream 320. Conveniently, the input comparison block 330 and the output comparison block 340 are readily available from normal operation of the encoder module 400 as a decoded frame 410 and reference frame 420, respectively.

Encoder Operation

Figure 5:
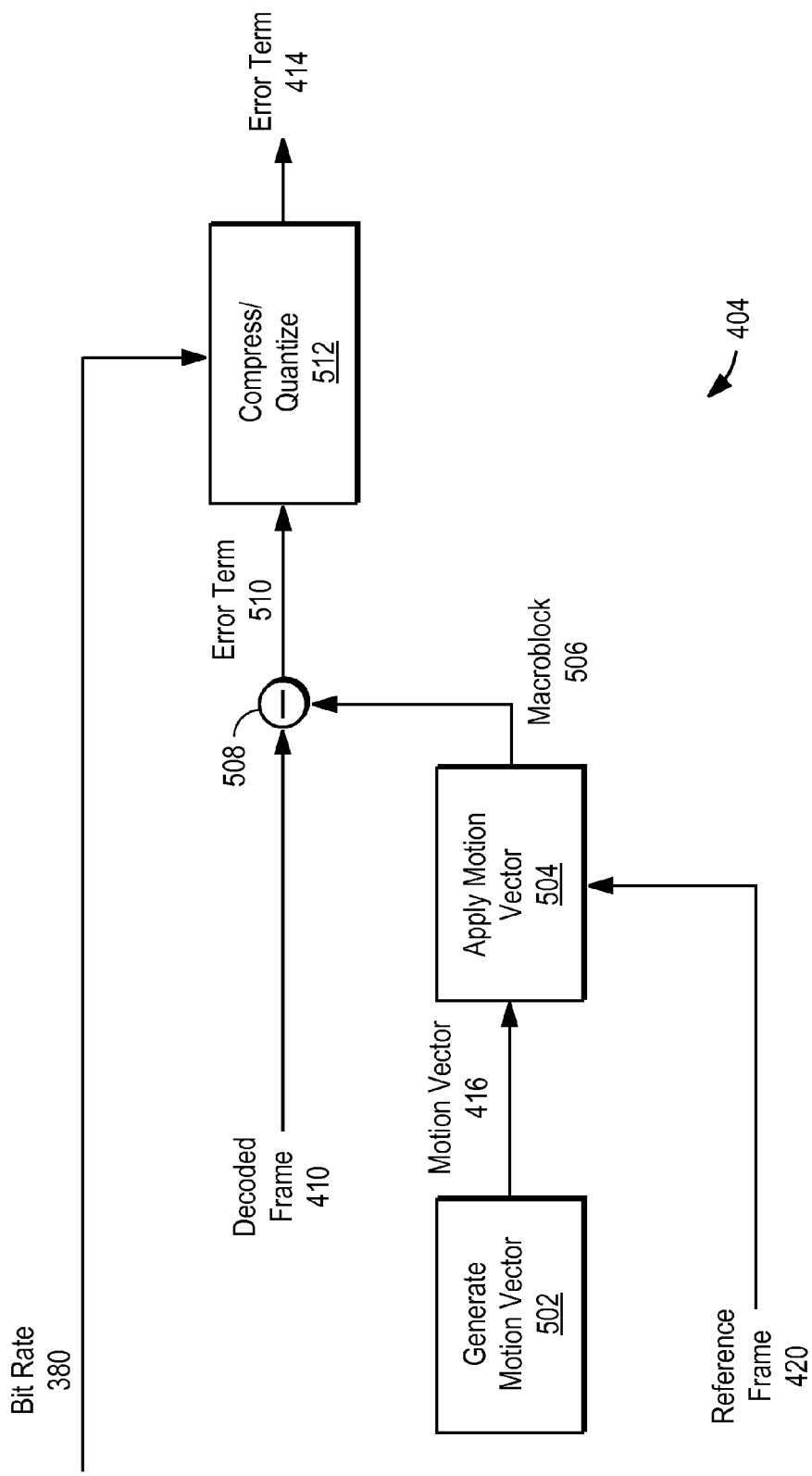
FIG. 5 is a block diagram illustrating one embodiment of a method for operating an encoder module.

FIG. 5 illustrates a method for encoding a frame of video, according to one embodiment. In one embodiment, the described method is performed by the encoder 404 for pictures with interframe compression. Additional steps not shown are taken for pictures with intraframe compression either exclusively or in conjunction with interframe compression. The encoder receives an uncompressed or raw frame 410 and a reference frame 420. In one embodiment, the uncompressed or raw frame 410 is received directly from the input stream 301. The reference frame 420 is received from reference frame storage 422 and may be generated by decoder 405 from a previous received frame.

In one embodiment, the encoder 404 generates 502 one or more motion vectors 416. The encoder 404 can generate 502 motion vectors 416, for example, by comparing the decoded frame 410 to the reference frame 420 and computing the movement of macroblocks between the reference frame 420 and the decoded frame 410. In one embodiment, the encoder 404 applies 504 the motion vectors 416 to the reference frame 420 to produce a predictor macroblock 506

The encoder 404 subtracts 508 the predictor macroblock 506 from the uncompressed frame 410 to produce an error term 510. The encoder 404 compresses and/or quantizes 512 the error term 510 to produce a residual or error term 414. In one embodiment, the bit rate 380 is used in compressing and/or quantizing 512 the error term 510. The motion vectors 416 and the error term 414 are components of the output stream 320. Furthermore, as illustrated in FIG. 4, the motion vectors 416 and the error term 414 are inputted into the decoder 405 as part of the Compressed Output Stream 320.

Decoder Operation

Figure 6:
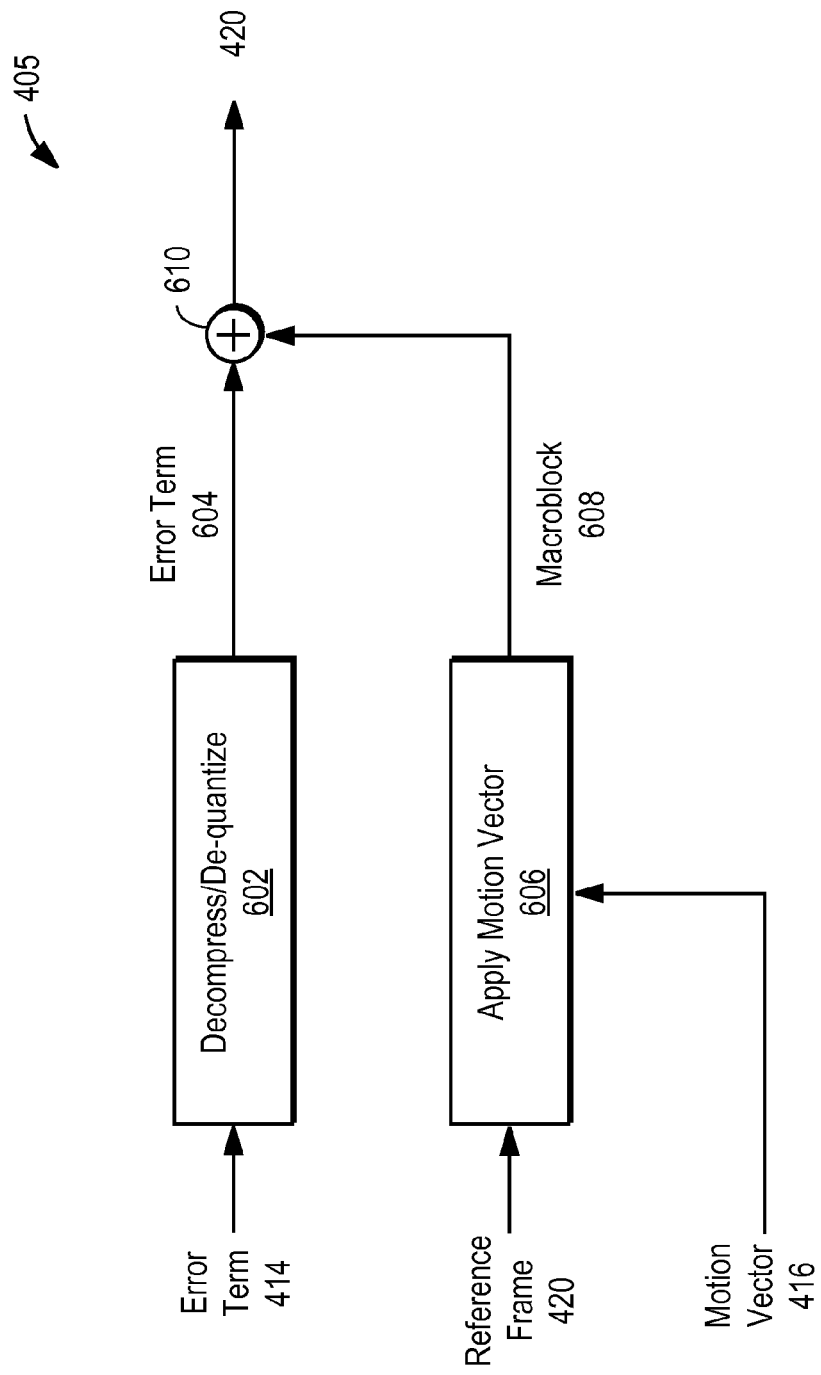
FIG. 6 is block diagram illustrating one embodiment of a method for operating a decoder.

FIG. 6 illustrates an interprediction method for decoding a frame of video, according to one embodiment. In one embodiment, the method is performed by the decoder 405. Note the decoder 405 can also perform an intraprediction method which is not shown. The method illustrated may also be performed by a remote decoder to regenerate input stream 301.

The decoder 405 receives a reference frame 420 from reference frame storage 422. The decoder 405 also receives motion vectors 416 from the Compressed Output Stream 320 for interframe compressed frames. The motion vectors 416 describe, generally in a spatial domain, how macroblocks from one frame are related to macroblocks of a previous or subsequent frame (e.g., the reference frame 420). In one embodiment, the decoder 405 applies 606 the motion vectors 416 to the reference frame 420 for interframe predicted macroblocks. The motion vectors 416 can be applied 606 to the reference frame in a spatial or a compressed domain. The application 606 of the motion vectors 416 to the reference frame 420 produces a predictor macroblock 608. According to various embodiments, applying 606 the motion vector may further include applying additional compression parameters such as macroblock type, macroblock mode, and/or quantization parameters.

The decoder 405 receives a transformed and quantized error term 414 from the Compressed Output Stream 320 for interframe compressed frames and generates a new error term 604. The error term 414 describes how the macroblock 608 should be modified to improve the fidelity of the resulting frame and the inverse quantization term describes how the error term 414 is reconstructed from 608. For example, the error term 414 may include information related to transients not encoded in the motion vector 416. The error term 414 and inverse quantization term can be described in a spatial or compressed domain.

In one embodiment, the decoder 405 decompresses 602 the error term 414 to produce an error term 604. For example, according to various standards, the error term can be encoded using various lossy and/or lossless compression techniques. In one embodiment, decompressing 602 the error term 414 can include transforming the error term 414 from a compressed to a spatial domain, for example, by applying a transformation derived from an Inverse Discrete Cosine Transform. In one embodiment, the decoder 405 inverse quantizes 602 the error term 414 to produce the error term 604. The decompression and/or inverse quantization 602 performed by the decoded 504 can depend on the format of the input/output stream processed by the decoder 504.

The decoder 405 adds 610 the error term 604 to the macroblock 608 to produce a macroblock for the reference frame 420. The reference frame 420 can be in a spatial or a compressed domain. Conveniently, because the reference frame 420 is a decoded version of the output stream 320, the reference frame 420 (or a macroblock from the reference frame 420) can be used as the output comparison block 340 and compared against the input comparison block 330 for the quality measurement.

Transcoder Architecture

Figure 7:
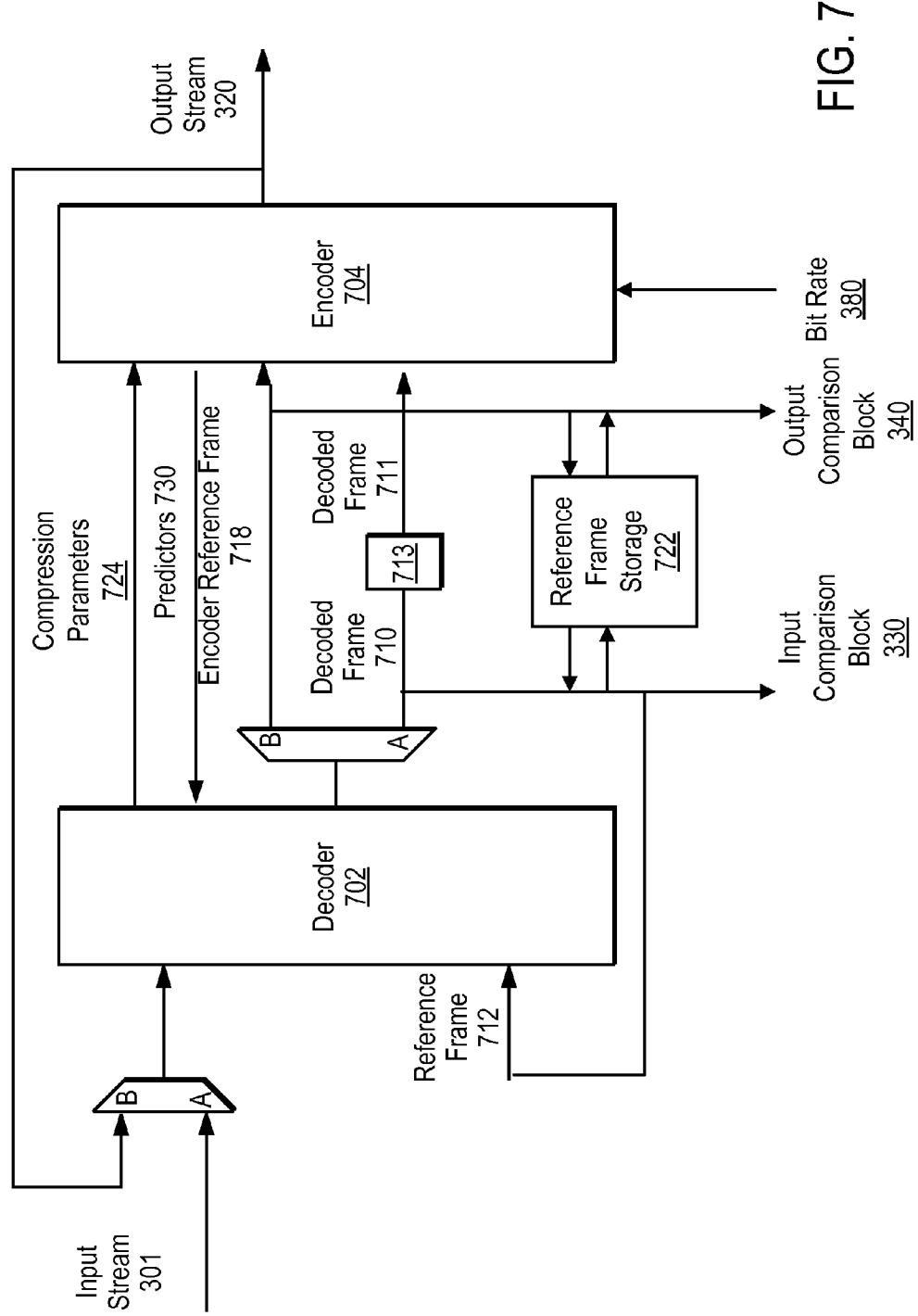
FIG. 7 is a block diagram illustrating one embodiment of a transcoder.

Referring now to FIG. 7, an example embodiment of a transcoder 700 for use as video conversion module 300 is illustrated. Generally, the transcoder 700 is adapted to receive an input stream 301 and generate an output stream 320. According to one embodiment, the input stream 301 is a compressed media stream in a first compressed format and the output stream 320 is a compressed media stream in a second compressed format. The transcoder 700 further generates an input comparison block 330 and an output comparison block 340 for quality measurement.

According to one embodiment, the decoder 702 is configured to operate in one of at least two modes of operation. In a first mode of operation, all input and output multiplexers are set to select input/output "A". In a second mode of operation, all input and output multiplexers are set to select input/output "B". In mode "A", the decoder 702 decodes the input stream 301 with reference to a previously stored reference frame 712 to produce a decoded frame 710. In one embodiment, the decoder 702 may further use a variety of input compression parameters including quantization, macroblock type/mode, etc. in decoding the input frame. The decoder 702 may receive the reference frame 712 from a reference frame storage 722 having a repository of previously decoded frames 710.

According to various embodiments, the decoded frame 710 can be described in either a spatial or a compressed domain. The decoded frame 710 is stored by the decoder 702 in reference frame storage 722 to be used as a reference frame 712 for future received frames and is also the output of the decoder 702. Further, in one embodiment, decoded frame 710 is outputted as the input comparison block 330 to be received by the quality checker 350.

In mode "B", the decoder 702 functions similarly to the decoder 405 in FIG. 4 to generate an encoder reference frame 718 from the output of the Decoder 702. In this mode, the decoder 702 decodes the output stream 320 to generate an encoder reference frame 718. In mode B, a reference frame is not needed for the Decoder because the predictors 730 are also passed from the Encoder to the Decoder. The encoder reference frame 718 is used by the encoder 704 to encode future received frames. Further, in one embodiment, encoder reference frame 718 is outputted as the output comparison block 340 to be received by the quality checker 350.

According to one embodiment, the decoder 702 alternates between mode "A" and mode "B" at twice the rate of the incoming frames. Thus, for each received frame from input stream 301, the decoder 702 decodes the input frame (in mode "A") to produce a decoded frame 710, switches to mode "B", and decodes a frame received from output stream 320 to produce a new encoder reference frame 718. While in at least one embodiment, the decoder 702 transitions between modes based on time, other methods for multiplexing the decoder 702 will be apparent to one of skill in the art without departing from the scope of the disclosure.

In one embodiment, the decoded frame 710 is coupled to an image processor 713 adapted to process the decoded frame 710 to produce a decoded frame 711. For example, the image processor 713 can be configured to change the size, characteristics, or sampling rate of the decoded frame 710, or to perform image enhancement such as deblocking to remove blocking artifacts or other modifications on the decoded frame 710. The image processor 713 can operate on the decoded frame 710 in a spatial domain, a compressed domain, or both. Other examples of transformation that can be performed by the image processor 713 will be apparent to one of skill in the art without departing from the scope of the disclosure. In alternative embodiments, the image processor 713 is not included and the decoded frame 711 can be equivalent to the decoded frame 710. According to one embodiment different than the illustrated embodiment, decoded frame 711 can be used as the input comparison block 330 instead of decoded frame 710.

The encoder 704 receives the decoded frame 711 and generates the output stream 320. In one embodiment, the encoder 704 uses at least one encoder reference frame 718 and the decoded frame 711 to produce the output stream 320. The encoder 704 may further use compression parameters 724 received from the decoder 702, and an encoder bit rate 380 to generate the output stream 320 from the decoded frame 711. The output stream 320 comprises among other items, an error term and motion vectors describing how a decoded reference frame at the remote receiver's decoder should be modified to produce a frame similar to the decoded frame 711 (for frames with interframe compression). The output stream 320 is used as the input to the decoder 702 in mode "B" along with the Predictors 730.

The system is configured so that the format and compression method of the input stream 301 can be different from the format and compression method of the output stream 320. The input stream 301 including the error terms, motion vectors, and compression parameters (such as quantization, macroblock type/mode, etc.) of the input stream 301 may be described differently from the output frame information including the error terms and motion vectors, and compression parameters of the output stream 320. Furthermore, the encoder reference frame 718 and the decoded frame 710 can be of different size, compression ratio, and so on. Because the decoder 702 is adapted to both produce decoded frames 710 from the input stream 301 as well as produce encoder reference frames 718 from the output stream 320, the decoder 702 is typically configured to operate on error terms, motion vectors, compression parameters used in a variety of formats. In the first mode, for example, the decoder 702 receives an error term, motion vectors, and a variety of the compression parameters including quantization, macroblock type/mode, etc. of a first format to produce a decoded frame 710, and in the second mode, the decoder 702 receives an error term, motion vectors, and a variety of the compression parameters including quantization, macroblock type/mode, etc. of a second format to produce an encoder reference frame 718.

It will be apparent to one of ordinary skill in the art that other embodiments of transcoder 700 are possible without departing from the scope of the disclosure. For example, in one embodiment, a decoder for generating decoded frames 710 is independent and separate from a second decoder for generating the encoder reference frames 718. In this embodiment, the decoder inputs and outputs are not multiplexed because there is one decoder corresponding to mode "A" and a second decoder corresponding to mode "B". Further, in this embodiment, the decoder for producing encoder reference frames 718 may be integrated into encoder 704, similar to the encoder module 400.

Process for Adjusting Bit Rate Based on Measured Quality

The architecture of video conversion module 300 should not be limited to the encoder module 400 or transcoder 700 architectures described above. Rather, the video conversion module may be any architecture for converting between video formats and for generating input 330 and output 340 comparison blocks for quality measurement by the quality checker 350. Thus, encoder module 400 and transcoder 700 are merely illustrative examples of video conversion modules 300 for use in the system of FIG. 3.

Figure 8:
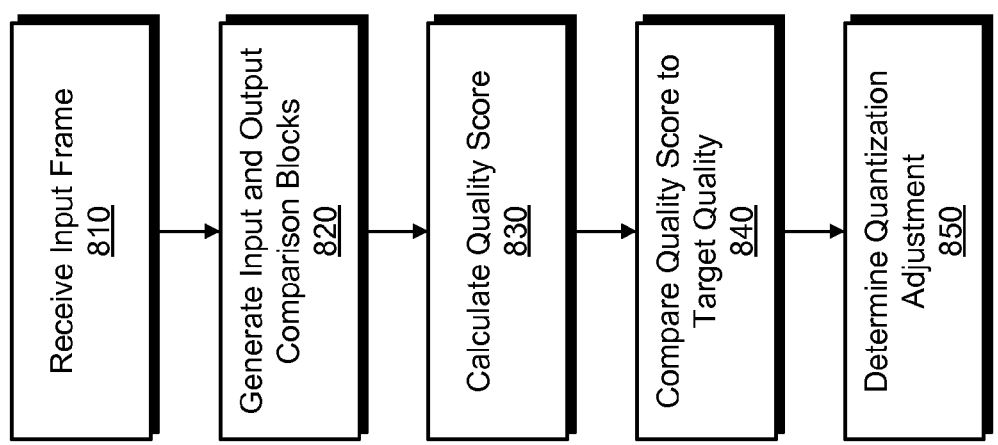
FIG. 8 is a flowchart illustrating one embodiment of a method for adjusting bit rate in a video conversion module based on measured quality.

The operation of the system in FIG. 3 may also be described in terms of a process. FIG. 8 is a flowchart illustrating a process for adjusting bit rate based on measured quality in accordance with one embodiment. At step 810, video conversion module 300 receives an input frame from the compressed input stream 301. In the process of converting (e.g., encoding or transcoding) the received frame, the video conversion module 300 generates 820 input 330 and output 340 comparison blocks as described above. The input comparison block 330 and output comparison block 340 correspond to the same received input frame, macroblock, or set of macroblocks. At step 830, quality checker 350 calculates 830 a quality score 355 by comparing the input comparison block 330 and the output comparison block 340. The quality score 355 is compared 840 to the target quality 370. Based on the comparison, bit rate controller 360 determines 850 an adjusted bit rate 380.

It is noted that the order in which the steps of the disclosed methods are performed is purely illustrative in nature. The steps can be performed in any order or in parallel, unless otherwise indicated by the present disclosure. The methods may be performed in hardware, firmware, software, or any combination thereof operating on a single computer or multiple computers of any type. Software embodying the disclosure may comprise computer instructions in any form (e.g., source code, object code, interpreted code, etc.) stored in any computer-readable storage medium (e.g., a ROM, a RAM, a flash memory, a magnetic media, a compact disc, a DVD, etc.). Such software may also be in the form of an electrical data signal embodied in a carrier wave propagating on a conductive medium or in the form of light pulses that propagate through an optical fiber.

While particular embodiments have been shown and described, it will be apparent to those skilled in the art that changes and modifications may be made without departing from the principles herein in its broader aspect and, therefore, the appended claims are to encompass within their scope all such changes and modifications, as fall within the true spirit of this disclosure.

Reference in the specification to "one embodiment" or "an embodiment" means that a particular feature, structure, or characteristic described in connection with the embodiment is included in at least one embodiment of the system or method disclosed herein. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure herein also relates to an apparatus for performing the operations herein. This apparatus can be specially constructed for the required purposes (e.g., an application specific integrated circuit (ASIC)), or it can comprise a general-purpose computer selectively activated or reconfigured by a computer program stored in the computer. Such a computer program (e.g., comprised of instructions corresponding to the processes described above and executable by a processor) can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the embodiments disclosed are not described with reference to any particular programming language. It will be appreciated that a variety of programming languages can be used to implement the teachings of the embodiments as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, it can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

What is claimed is:

1. A method for processing video comprising:
   receiving an input video stream in a first format and a target quality;
   generating an input comparison block including a first subset of macroblocks in a frame or field of the received input stream in a first mode by decoding the input video stream at a decoder;
   converting the input stream in the first format to an output stream in a second format, the output stream having an output bit rate and an output quality;
   generating an output comparison block including a second subset of macroblocks in a frame or field of the output stream in a second mode by decoding the output stream at the decoder;
   measuring a quality difference between the input comparison block and the output comparison block;
   generating a quality score representing an estimate of the output quality based on the measured quality difference; and
   adjusting the output bit rate of the output stream based on the quality score and the target quality.

2. The method of claim 1, wherein generating the quality score comprises determining a peak signal to noise ratio (PSNR).

3. The method of claim 1, wherein generating the quality score comprises determining a mean squared error (MSE).

4. The method of claim 1, wherein macroblocks having a fixed interval within the field or frame of the input stream are selected as the first subset of macroblocks and macroblocks having a fixed interval within the field or frame of the output stream are selected as the second subset of macroblocks.

5. The method of claim 1, wherein the input stream is uncompressed and converting the input stream to a compressed output stream comprises encoding the input stream.

6. The method of claim 1, wherein the input stream is in a compressed format and converting the input stream comprises transcoding the input stream.

7. The method of claim 1, wherein adjusting the output bit rate comprises individually adjusting at least one of quantization, frame rate, and resolution of the output stream.

8. The method of claim 1, wherein adjusting the output bit rate comprises increasing the output bit rate in response to the quality score being less than the target quality, and decreasing the output bit rate in response to the quality score being greater than the target quality.

9. A system for processing video comprising:
   a video conversion module comprising at least one hardware component and configured to:
      receive an input stream in a first format;
      generate an input comparison block including a first subset of macroblocks in a frame or field of the received input stream in a first mode by decoding the input stream at a decoder of the video conversion module;
      convert the input stream in the first format to an output stream in a second format, the output stream having an output bit rate and an output quality; and
      generate an output comparison block including a second subset of macroblocks in a frame or field of the output stream in a second mode by decoding the output stream at the decoder;
   a bit rate controller coupled to the video conversion module, the bit rate controller configured to:
      compare a quality score to a target quality, the quality score representing an estimate of the output quality; and
      adjust the output bit rate in response to the comparison having a difference greater than a predetermined value; and
   a quality checker coupled to the video conversion module and the bit rate controller, the quality checker configured to:
      receive the input comparison block and the output comparison block;
      measure a quality difference between the input comparison block and the output comparison block;
      generating the quality score based on the measured quality difference; and output the quality score to the bit rate controller.

10. The system of claim 9, wherein generating the quality score comprises determining a peak signal to noise ratio (PSNR).

11. The system of claim 9, wherein generating the quality score comprises determining a mean squared error (MSE).

12. The system of claim 9, wherein the video conversion module is further configured to select macroblocks having a fixed interval within the field or frame of the input stream as the first subset of macroblocks and to select macroblocks having fixed interval within the field or frame of the output stream as the second subset of macroblocks.

13. The system of claim 9, wherein the input stream is uncompressed or raw and converting the input stream comprises encoding the input stream.

14. The system of claim 9, wherein the input stream is in a compressed format and converting the input stream comprises transcoding the input stream.

15. The system of claim 9, wherein the bit rate controller is further configured to individually adjust at least one of quantization, frame rate, and resolution of the output stream.

16. The system of claim 9, wherein the bit rate controller is further configured to increase the output bit rate in response to the quality score being less than the target quality, and decrease the output bit rate in response to the quality score being greater than the target quality.

17. A non-transitory computer readable storage medium structured to store instructions executable by a processor, the instructions when executed cause the processor to:
   receive an input video stream in a first format and a target quality;
   generate an input comparison block including a first subset of macroblocks in a frame or field of the received input stream in a first mode by decoding the input video stream;
   convert the input stream in the first format to an output stream in a second format, the output stream having an output bit rate and an output quality;
   generate an output comparison block including a second subset of macroblocks in a frame or field of the output stream in a second mode by decoding the output stream;
   measure a quality difference between the input comparison block and the output comparison block;
   generate a quality score representing an estimate of the output quality based on the measured quality difference; and
   adjust the output bit rate of the output stream based on the quality score and the target quality.

18. The computer readable storage medium of claim 17, wherein generating the quality score comprises determining a peak signal to noise ratio (PSNR).

19. The computer readable storage medium of claim 17, wherein generating the quality score comprises determining a mean squared error (MSE).

20. The computer readable storage medium of claim 17, wherein macroblocks having a fixed interval within the field or frame of the input stream are selected as the first subset of macroblocks and macroblocks having a fixed interval within the field or frame of the output stream are selected as the second subset of macroblocks.

21. The computer readable storage medium of claim 17, wherein the input stream is uncompressed or raw and converting the input stream to a compressed output stream comprises encoding the input stream.

22. The computer readable storage medium of claim 17, wherein the input stream is in a compressed format and converting the input stream comprises transcoding the input stream.

23. The computer readable storage medium of claim 17, wherein adjusting the output bit rate comprises individually adjusting at least one of quantization, frame rate, and resolution of the output stream.

24. The computer readable storage medium of claim 17, wherein adjusting the output bit rate comprises increasing the output bit rate in response to the quality score being less than the target quality, and decreasing the output bit rate in response to the quality score being greater than the target quality.

* * * * *